United States Patent
Ephrati et al.

(10) Patent No.: US 7,296,001 B1
(45) Date of Patent: Nov. 13, 2007

(54) ELECTRONIC MULTILATERAL NEGOTIATION SYSTEM

(75) Inventors: Eithan Y. Ephrati, Sunnyvale, CA (US); Yoav Shoham, Palo Alto, CA (US); Michael P. Wellman, Ann Arbor, MI (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/426,410

(22) Filed: Oct. 25, 1999

Related U.S. Application Data

(60) Provisional application No. 60/143,291, filed on Jul. 12, 1999.

(51) Int. Cl.
*G06Q 40/00* (2006.01)

(52) U.S. Cl. .......................................... 705/37; 705/80

(58) Field of Classification Search .................. 705/26, 705/37, 80, 35
See application file for complete search history.

(56) References Cited

U.S. PATENT DOCUMENTS

| | | | |
|---|---|---|---|
| 3,581,072 A | 5/1971 | Nymeyer | |
| 4,789,928 A | 12/1988 | Fujisaki | |
| 5,101,353 A | 3/1992 | Lupien et al. | |
| 5,136,501 A | 8/1992 | Silverman et al. | |
| 5,319,542 A | 6/1994 | King, Jr. et al. | |
| 5,603,034 A | 2/1997 | Swanson | |
| 5,615,109 A | 3/1997 | Eder | |
| 5,689,652 A | 11/1997 | Lupien et al. | |
| 5,727,165 A | 3/1998 | Ordish et al. | |
| 5,745,765 A | 4/1998 | Paseman | |
| 5,774,873 A | 6/1998 | Berent et al. | |
| 5,794,207 A | 8/1998 | Walker et al. | |
| 5,794,219 A | 8/1998 | Brown | |
| 5,799,284 A | 8/1998 | Bourquin | |
| 5,812,572 A | 9/1998 | King et al. | |
| 5,812,668 A | 9/1998 | Weber | |

(Continued)

FOREIGN PATENT DOCUMENTS

EP     1 077 422 A2    2/2001

(Continued)

OTHER PUBLICATIONS

INSS—About INSS, last modified Mar. 11, 1998.*

(Continued)

*Primary Examiner*—Ronald Laneau
(74) *Attorney, Agent, or Firm*—Van Pelt, Yi & James LLP

(57) ABSTRACT

A system and method for managing multilateral negotiations are disclosed. The method generally includes sending a negotiation initiating offer object to a first negotiating party for specifying rules of the negotiation and for forming a negotiation initiating offer including specification of at least one attribute. The method also includes receiving the negotiation initiating offer from the first negotiating party, sending a counter offer object to a second negotiating party for forming a counter offer to the first negotiating party, receiving the counter offer from the second negotiating party, validating the counter offer if the counter offer complies with the rules of the negotiation, and sending the validated counter offer to the first negotiation party to engage the negotiation parties in an active negotiation. The counter offer object is adapted for specification of at least one additional attribute. A negotiation facilitator system for managing an electronic negotiation and a computer program product for managing a multilateral negotiation are also disclosed.

20 Claims, 12 Drawing Sheets

U.S. PATENT DOCUMENTS

| | | | |
|---|---|---|---|
| 5,835,896 A | 11/1998 | Fisher et al. | |
| 5,844,554 A | 12/1998 | Geller et al. | |
| 5,845,266 A | 12/1998 | Lupien et al. | |
| 5,862,223 A | 1/1999 | Walker et al. | |
| 5,873,071 A * | 2/1999 | Ferstenberg et al. | 705/36 R |
| 5,890,137 A | 3/1999 | Koreeda | |
| 5,890,138 A | 3/1999 | Godin et al. | |
| 5,905,975 A | 5/1999 | Ausubel | |
| 5,913,210 A | 6/1999 | Call | |
| 5,949,876 A * | 9/1999 | Ginter et al. | 705/80 |
| 5,950,001 A | 9/1999 | Hamilton et al. | |
| 5,966,699 A | 10/1999 | Zandi | |
| 6,014,643 A | 1/2000 | Minton | |
| 6,055,518 A | 4/2000 | Franklin et al. | |
| 6,085,169 A | 7/2000 | Walker et al. | 705/26 |
| 6,085,178 A * | 7/2000 | Bigust et al. | 705/80 |
| 6,101,484 A | 8/2000 | Halbert et al. | 705/26 |
| 6,131,087 A * | 10/2000 | Luke et al. | 705/26 |
| 6,146,272 A | 11/2000 | Walker et al. | 273/138.1 |
| 6,192,354 B1 * | 2/2001 | Bigus et al. | 706/46 |
| 6,269,343 B1 | 7/2001 | Pallakoff | 705/26 |
| 6,401,080 B1 * | 6/2002 | Bigus et al. | 705/37 |
| 6,408,282 B1 * | 6/2002 | Buist | 705/37 |
| 6,658,568 B1 * | 12/2003 | Ginter et al. | 713/193 |
| 7,051,212 B2 * | 5/2006 | Ginter et al. | 713/193 |
| 2005/0119980 A1 * | 6/2005 | Kohavi et al. | 705/80 |

FOREIGN PATENT DOCUMENTS

| | | |
|---|---|---|
| WO | WO 01/79961 A2 | 10/2001 |

OTHER PUBLICATIONS

INSS FAQ, Sep. 1, 1998.*
INSS—Negotiation Protocols, last modified Jul. 23, 1998.*
INSS—Using INSS: An Example, last modified Mar. 13, 1998.*
IInterNeg Home Page, last modified Jan. 24, 1998.*
Negotiating through INSS, last modified Sep. 1, 1998.*
What's new with Inspire and InterNeg, last modified Sep. 2, 1997.*
Kersten, Negotiation Support Systems and Negotiating Agents, Colloque SMAGET, Oct. 5-8, 1998.*
Black's Law Dictionary, Sixth Edition, 1990, pp. 349, 1081-1082, 1317.*
Gregory E. Kersten, negotiation Support Systems and Negotiating Agents, Colloque SMAGET, Oct. 5-8, 1998 (clean versio no reprint/revision).*
Dennis Hevesi, Market Indicators: Multiple Bids, Unbound Binders, Frayed Tempers, New York Times, Sep. 21, 1997, p. 9.1.*
Paula S. Bird and Andrew L. Bab, anatomy of the No-Shop Provision, Insights, vol. 12, No. 8, Aug. 1998, pp. 2-10.*
Christopher A. Hobson, E-Negotiations: Creating a Framework for Online Commercial Negotiations, Negotiation Journal, vol. 15, No. 3, Jul. 1999, pp. 201-218.*
Merriam Webster's Collegiate Dictionary, Tenth Edition, 1996, pp. 12, 415, 585.*
Search Report dated Oct. 18, 1999m 3 pgs.
Onsale, About Onsale, 1996, 2 pgs.
ONSALE, Auction Formats, 1996, 2pgs.
ONSALE, Auction Supersite, Sep. 8, 1997, 7 pgs.
ONSALE, Home, Sep. 8, 1997, 4 pgs.
CURRENT Catalog, Christmas Wishes 1991, 4 pgs.
Frook, John Evan, Packaged apps give auctioneers rich new options, Internetweek, May 25, 1998. Issue 716, p. 14, 4/7 p. 2 graphs, 2 pgs.
Trommer, Diane Moai Intros Auction Software, Electronic Buyer's News, Mar. 23, 1998, Issue 1101, p. 78, 1/4p, 2 pgs.
Wilder, Clinton, Auctions for Business, Information Week, Mar. 16, 1998, Issue 673, p. 90, 2/3p. 1c., 2 pgs.
Millman, Howard, "Legacy Data Links Shrink Costs" Info. World, Jan. 5, 1998, vol. 20, Issue 1, p. 51, 2p, 1 chart, 1c, 4 pgs.
Opensite Technologies Introduces Innovative Web Auction Partner Program, Business Wire Page, 08041472, 3 pages, Aug. 4, 1998.
Mase, K., et al., Scripting Method Based on Temporal Intervals for Designing Interactive Systems, Transactions of the Information Processing Society of Japan, vol. 39, Issue 5 p. 1403-13, 2 pgs. May 1, 1998.
Emaze Software Offers WebThread, ScriptWizard on BuyDirect. com, Business Wire Page: 12120089, 3 pgs. Dec. 12, 1996.
Cohen, Emily, Going . . . Going . . . Gone! (Fairmarket's Web Auction Site, and Emaze Software's.
Search Report for PCT/US00/15982, mailed Aug. 23, 2000; 6pgs.
International Preliminary Exaimination Report for PCT/US99/17248 dated Apr. 27, 2001, 6 pages.
Search Report for PCT /US00/17449, mailed Nov. 14, 2000 4 pages.
International Preliminary Examination Report for PCT/US00/15982 mailed May 8, 2001, 6 pages.
Written Opinion for PCT/US00/17449 dated Apr. 25, 2001, 7 pages.
Lal, Rajiv, et al.; An Appraoch For Developing An Optimal Discount Pricing Policy; Management Science, vol. 30, No. 12, Dec. 1984, pp. 1524-1539; the Institute of Management Sciences.
U.S. Appl. No. 60/097,933, filed Aug. 18, 1998, Pallakoff.
U.S. Appl. No. 60/097,932, filed Aug. 21, 1998, Pallakoff.
Sairamesh, J. et al., "Economic Framework for Pricing and Charging in Digital Libraries," D-Lib Magazine, ISSN 1082-9873, Feb. 1996.
Marrinucci, Sandra, "Net Proves a Boon for Research," Electronic Engineering Times, Sep. 22, 1997.
Bailey, Joseph P. and Bakos, Yannis, "An Exploratory Study of the Emerging Role of Electronic Intermediaries," International Journal of Electronic Commerce, vol. 1, No. 3, Spring 1997, pp. 7-20.
Negroponte, Nicholas, "Psst! Transactions," Forbes, 80th Issue, Jul. 7, 1997.
Ferranti, Marc, "Electronic Commerce: Ties That Bind," InfoWorld, vol. 9, No. 14, Apr. 7, 1997, pp. 59-62.

* cited by examiner

← 300

```
┌─────────────────────────────────────┐
│   OFFER AND OFFEROR IDENTIFICATIONS │
├─────────────────────────────────────┤
│   SERVICE/PRODUCT ATTRIBUTE 1, 2, ... │
├─────────────────────────────────────┤
│   NEW ATTRIBUTES 1, 2, ...          │
├─────────────────────────────────────┤
│   FREE TEXT BOX                     │
├─────────────────────────────────────┤
│   OFFER EXPIRATION DATE AND TIME    │
├─────────────────────────────────────┤
│   DIRECTED OR UNDIRECTED OFFER      │
├─────────────────────────────────────┤
│   IF UNDIRECTED, PARTIES ELIGIBLE TO│
│   RESPOND TO THIS OFFER             │
├─────────────────────────────────────┤
│   IF DIRECTED, TARGET OFFER         │
│   IDENTIFICATION(S)                 │
└─────────────────────────────────────┘
```

FIG. 3

ELECTRONIC MULTILATERAL NEGOTIATION SYSTEM

CROSS REFERENCE TO RELATED APPLICATIONS

This application claims priority to U.S. Provisional Patent Application No. 60/143,291, filed on Jul. 12, 1999, which is incorporated herein by reference in its entirety.

BACKGROUND OF THE INVENTION

1. Field of the Invention

The present invention relates generally to a system and method for managing a negotiation. More specifically, a system and method for structured bilateral and multilateral negotiations are disclosed.

2. Description of Related Art

The explosive field of online electronic commerce has resulted in a number of online commerce mechanisms. Some of the online electronic commerce mechanisms simply mirror off-line commerce mechanisms while others are unique to the new electronic commerce medium. Generally, a key component of a commerce mechanism is the determination of whether a trade is to take place and, if the trade is to take place, the determination of the terms of the trade, e.g., the goods, services, and/or payments involved.

One example of a commerce mechanism is a take-it-or-leave-it, fixed-terms mechanism. An off-line merchant, such as a local supermarket, is an example of such a mechanism. In particular, the supermarket displays a price and the shopper has the option of purchasing the product at the displayed price or not purchase the product at all. Similarly, an online merchant may display a list of offered products and/or services and the associated prices and/or other attributes, such as delivery method and time. An online electronic shopper may accept the terms by purchasing some of the offered products and/or services via the Internet browser interface or not purchase any of the listed products or services at all.

Another example of a commerce mechanism is an auction. In an auction, the terms of the deal are typically determined through a competitive process in which multiple parties may participate. Generally, the terms of the deal include a price and quantity of the product. A single-sided auction, both online and off-line, is an example of an auction. In a single-sided auction, either a single seller offers one or more products and/or services for sale to one or more competing buyers, or a single buyer offers to purchase one or more products and/or services from one or more competing sellers. Off-line auction commerce mechanism is well known while online auction commerce mechanism is currently an exploding field.

Yet another example of a commerce mechanism is a bilateral negotiation. In a bilateral negotiation, a buyer and a seller trade offers and counter-offers back and forth until either a deal is struck or the bilateral negotiation is somehow terminated. A residential real estate buyer and a residential real estate seller trading offers and counter-offers back and forth is an example of a bilateral negotiation. Examples of bilateral negotiation mechanisms also exist in the online electronic medium. Typical online electronic bilateral negotiation mechanisms generally comprise a structured way of making an initial offer followed by an unstructured bilateral negotiation process between the two parties. In these online bilateral negotiation mechanisms, the electronic medium merely serves as a communication tool, similar to a telephone, facsimile machine, or electronic mail, as well as a vehicle for posting the outcome of the negotiation, if desired.

The negotiation system of Altra Energy Technologies, Inc. (www.altranet.com) provides an example of an online bilateral negotiation for the energy industry. In Altra's online bilateral negotiation system, the negotiating parties can trade in an anonymous automated exchange. In addition, the negotiating parties have the option of selecting a listed offer and entering an informal negotiation process "under the radar screen." During the negotiation process, the offer is marked as being under negotiation and, upon successful conclusion of the negotiation process, the terms of the negotiated deal are posted.

The negotiation system of CheMatch system (www.chematch.com) provides example of an online bilateral negotiation for the petrochemical industry. Similar to the Altra negotiation system, the negotiating parties post structured offers in the CheMatch system. In particular, the posted offers specify the various attributes of the product for sale, such as price, quantity, purity level, location, delivery time, etc. The negotiation process involves the sending back and forth of English text messages. The fact that an offer is under negotiation is generally signaled to all the market participants. However, unlike the Altra negotiation system, the final terms of the deal between two parties, if a deal is struck, are not released to the other market participants.

The online bilateral negotiation has the advantage being open-ended to allow the negotiating parties to express any comments or offers in natural language, closely resembling the process in the off-line bilateral negotiation process. However, there are many disadvantages to the conventional online bilateral negotiation process. For example, in the conventional online bilateral negotiation process, the negotiating parties are not given assistance in reaching a successful conclusion. In addition, there are no guarantees on the length of the negotiation and there is no coherent notion of the what the current state of the negotiation is that the negotiating party could take in at a glance. Another disadvantage to the conventional online bilateral negotiation process is that there is generally no meaningful way to recover the state of negotiation if the system crashes, i.e. the conventional online bilateral negotiation process does not provide for recoverability. Further, there generally is no coherent notion of what commitments to which any negotiating party can be held prior to the conclusion of the negotiation.

Some negotiation systems overcome some of these disadvantages. See, for example, www.interneg.org. As an example, each offer is typically precisely defined as values for certain attributes, such as price and warranty type. The state of the negotiation at any given point in time is thus generally clear to the negotiators. In such negotiation systems, an informal, natural-language note can augment the structured offer and it is up to the negotiation parties to decide to what extent to rely on the formal versus the informal components of the available information.

Nonetheless, the emphasis in the conventional negotiation systems is the bilateral negotiation. Any multilateral considerations are typically merely secondary. For example, the conventional negotiation system may simply collect backup offers until the current negotiation terminates and thus does not render the negotiation system a true multilateral negotiation system. Thus, what is needed is an electronic negotiation system that manages bilateral and multilateral negotiations within the context of an overall multilateral negotiation environment.

SUMMARY OF THE INVENTION

A system and method for managing multilateral negotiations are disclosed. The system and method provide for structured and managed multilateral negotiations. Several inventive embodiments of the present invention are described below.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for managing multilateral negotiations generally includes sending a negotiation initiating offer object to a first negotiating party for specifying rules of the negotiation and for forming a negotiation initiating offer including specification of at least one attribute. The method also includes receiving the negotiation initiating offer from the first negotiating party, sending a counter offer object to a second negotiating party for forming a counter offer to the first negotiating party, receiving the counter offer from the second negotiating party, validating the counter offer if the counter offer complies with the rules of the negotiation, and sending the validated counter offer to the first negotiation party to engage the negotiation parties in an active negotiation. The counter offer object is adapted for specification of at least one additional attribute.

A negotiation facilitator system for managing an electronic negotiation and a computer program product for implementing the methods for managing a multilateral negotiation are also disclosed.

These and other features and advantages of the present invention will be presented in more detail in the following detailed description and the accompanying figures which illustrate by way of example the principles of the present invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 shows an example of an offer object for an initiated negotiation;

DESCRIPTION OF SPECIFIC EMBODIMENTS

A system and method for managing multilateral negotiations are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Negotiation System

Figure 1:
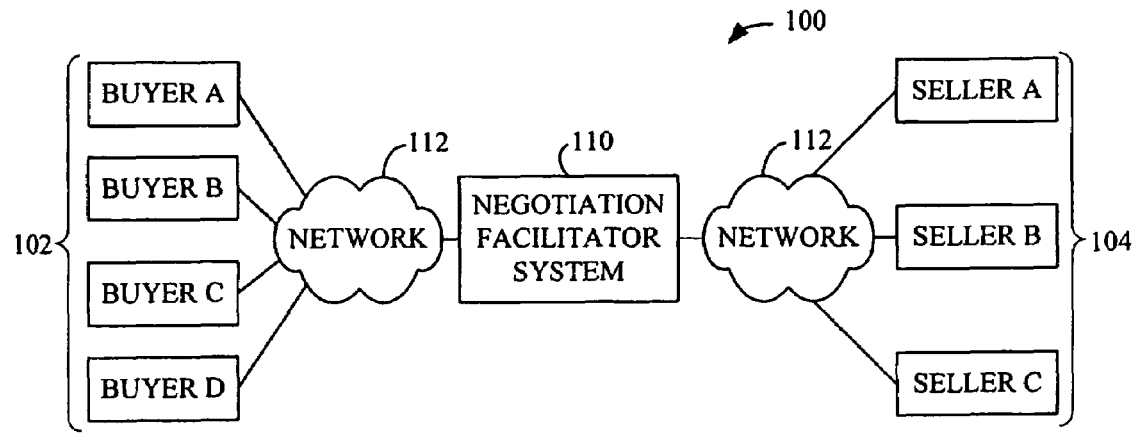
FIG. 1 is a schematic of a multilateral negotiation system utilizing a multilateral negotiation system and method.

FIG. 1 is a schematic of a multilateral negotiation system 100 generally comprising one or more buyers 102, one or more sellers 104, and a multilateral negotiation facilitator system 110. The buyers 102 and the sellers 104 are in communication with the negotiation facilitator system 110 via a network 112. The network 112 may be the Internet, an intranet, or an extranet, for example. An extranet may be a private network connection provided exclusively among two or more parties such as dealers, wholesalers, resellers, or suppliers.

The buyers 102 may submit multi-attribute offers to the negotiation facilitator system 110 via the network 112. Similarly, the sellers 104 may submit multi-attribute offers to the negotiation facilitator system 110 via the network 112. A multi-attribute offer is one in which the party submitting the bid may specify a plurality attributes of the goods or products subject to negotiation. Although any combination of goods and/or services may be the subject of the negotiation, the examples given herein assume that only goods are the subject of negotiation merely for purposes of clarity. The plurality of attributes specified preferably includes a price as well as other attributes of the goods. The attributes specified optionally include various quality characteristics of the goods, the time and location of delivery, the quantity, and/or a nominal or baseline price. For example, in the case of a semiconductor chip, quality characteristics such as feature size, speed, power consumption, operating temperature, expected life, warranty, and/or other quality characteristics may be specified by the buyer and/or the seller.

The negotiation facilitator system 110 manages the overall ongoing multilateral negotiations among the sellers and the buyers. At any point in time, the multilateral negotiations managed by the negotiation facilitator system 110 may include one or more bilateral negotiations and/or one or more multilateral negotiations. A bilateral negotiation is a one-to-one negotiation between one buyer and one seller. A multilateral negotiation can be one-to many, i.e., one buyer and multiple sellers or one seller and multiple buyers, or many-to-many, i.e., multiple buyers and multiple sellers. A multilateral negotiation generally includes one or more one-to-one and/or one-to many negotiations each involving the same or similar goods.

The negotiation facilitator system 110 receives the multi-attribute offers from the buyers 102 and sellers 104, facilitates the negotiation among the buyers 102 and sellers 104, and selectively discloses information regarding the negotiation to the buyers and sellers, depending upon their respective status in the negotiation. The various statuses of buyers and sellers will be explained and will become apparent in light of subsequent discussion. The functions and methodologies for the negotiation facilitator system 110 will also be described in more detail.

As shown in FIG. 1, there may be one or more buyers 102 and there may one or more sellers 104. Further, the number of buyers 102 need not equal the number of sellers 104. For purposes of discussion and clarity only, a buyer refers to a purchasing party and its associated set of offers for a given multilateral negotiation. Similarly, a seller refers to a selling party and a single set of offers for the given multilateral negotiation. Although any of the purchasing and selling parties may optionally also participate in other multilateral negotiations with other sets of offers associated therewith, the terms "buyer" and "seller" do not refer to those sets of offers associated with other multilateral negotiations. In other words, a buyer and a seller are specific to a given multilateral negotiation.

Negotiation Initiating Offer

Figure 2:
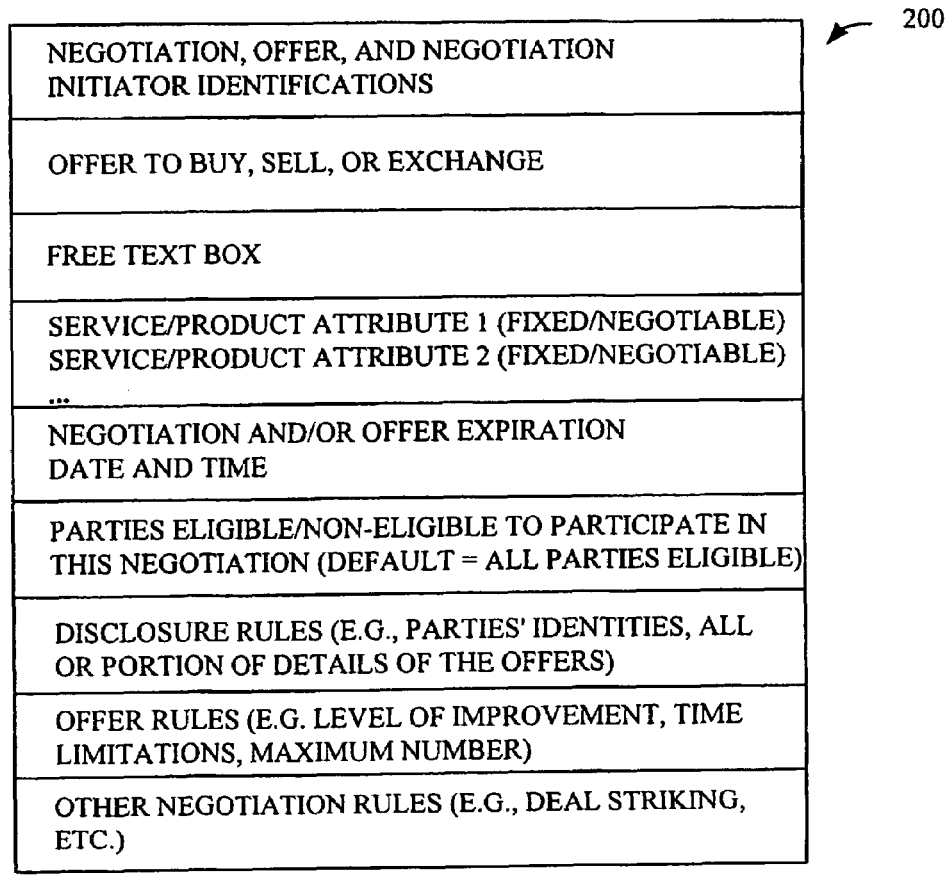
FIG. 2 shows an example of a negotiation initiating offer object.

FIG. 2 illustrates an example of an object 200 for posting an initial offer by a negotiation initiator. The term object may broadly refer to fields or data structure for an action. In particular, the negotiation initiating object 200 includes a negotiation identification and an offer identification, typically assigned by the negotiation facilitator system, and an identification of the negotiation initiator, which also may be a value assigned by the negotiation facilitator system. The identification of each offer submitting party, even if not disclosed to other parties, is preferably utilized by the negotiation facilitator system for keeping track of the history of the particular negotiation and/or any other purposes. Preferably, each party must register with the negotiation facilitator system prior to entering a negotiation and provide its identification information such as contact information, geographical location, financial eligibility such as credit rating, and/or list of preferred and/or exclusive trade partners. The negotiation facilitator system may then assign an identification number unique to the party, for example. Further, the negotiation initiator must also identify the offer as an offer to buy or sell. The negotiation initiator may also enter free text in free text box, such as "Serious offers only" or "I intend to make similar offers weekly."

The negotiation initiating object 200 optionally allows the negotiation initiator to select the type or category of goods that is the subject of the offer. Using the selected type of goods, the negotiation facilitator system preferably allows the negotiation initiator to specify or select certain attributes associated with the goods being offered for sale or purchase. The negotiation facilitator system may also automatically include certain attributes, such as quantity or price, and/or require the selection of one or more attributes from each set of attributes. Typical attributes include quantity, price, delivery date, delivery location, and/or quality, such as level of contaminants in parts per million, and/or speed. The attributes are generally selected from a library or database of attributes associated with each type of goods as provided by the negotiation facilitator system.

The negotiation facilitator system may select a set of common attributes for the type of goods by default and/or require inclusion of certain attributes in the negotiation, such as the price and quantity. For each attribute, a domain of acceptable values for the attribute may be defined and provided by the negotiation facilitator system. For example, the domain of values for the zip code of the manufacturing and/or the delivery location attribute may be all five and/or nine digit numbers or all valid zip codes in the U.S. and/or other countries. As another example, the domain of values for the price is optionally all values expressed in dollars and cents and/or other suitable currencies. As yet another example, the domain of values for a size may be non-numerical such as extra small, small, medium, large, and extra large. The negotiation initiator generally specifies a value for each of the attributes selected for the negotiation.

Negotiation Offers Subsequent to the Initial Negotiation Offer

FIG. 3 illustrates an example of an object 300 for posting all offers, including counter offers, subsequent to the initial offer by a negotiating party. The negotiation offer object 300 generally includes a subset of the negotiation initiating object 200. For example, the offer object 300 optionally includes an offer and offeror identifications, typically assigned by the negotiation facilitator system, an identification of the offer as an offer to buy, sell, or exchange, a free text box, and an offer expiration date and time.

In addition to the subset of the negotiation initiating object 200, the negotiation offer object 300 may also specify additional new attributes not specified by the negotiation initiating offer or another previous offer, such as a counter offer. Thus, throughout the negotiation, the number of attributes specified in an offer can increase. Each new attribute is preferably selected from the database or library of attributes of the negotiation facilitator system by the negotiation party submitting the new offer.

Further, the negotiation offer object 300 may also include whether the offer is directed or undirected. If the offer is undirected, a list of parties eligible or non-eligible to respond to this offer may be selected. This is typically a subset of the parties eligible to participate in the negotiation as specified by the negotiation initiator in the negotiation initiating object. Alternatively, if the offer is directed, the target offer identification is to be provided by the offering party and, as is evident, only the target party is eligible to respond to this offer. In some cases where there is only one possible target offer, the target offer identification need not be provided by the offering party and/or is already provided by the negotiation facilitator system.

For each offer object 300 submitted, the negotiation facilitator system must first validate the offer prior to disclosing the offer to other parties. An offer is valid if it is determined that the offer complies with or satisfies all the relevant rules of the negotiation. If the negotiation facilitator system validates the offer, the offer may automatically be admitted into an active negotiation or the offer may be disclosed to the offeree and the offeree determines whether to enter into an active negotiation with the offeror, depending upon the rules specified by the negotiation initiator.

Generally, if the negotiation facilitator system does not validate the offer, the negotiation facilitator system sends an offer invalid message to the offeror and the invalid offer is not disclosed to other parties.

Types of Negotiations

Figure 4:
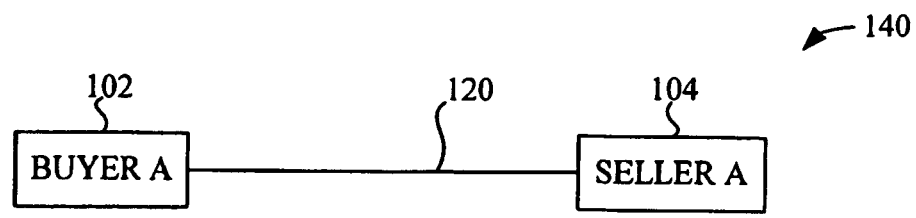
FIG. 4 is a schematic illustrating parties to a bilateral or one-on-one negotiation.
Figure 5:
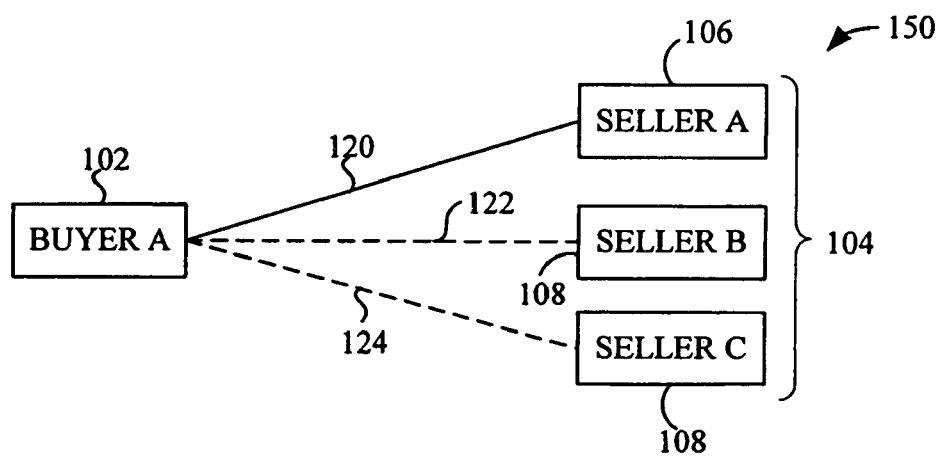
FIG. 5 is a schematic illustrating parties to a one-to-many multilateral negotiation.
Figure 6:
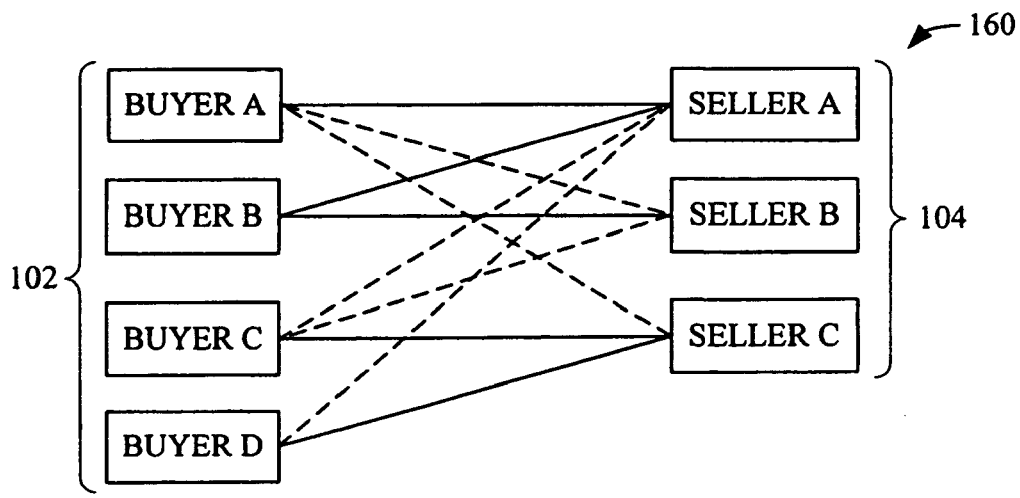
FIG. 6 is a schematic illustrating parties to a many-to-many multilateral negotiation.

FIGS. 4, 5, and 6 are schematics illustrating a bilateral or one-on-one negotiation 140, a one-to-many multilateral negotiation 150, which can be either switchable or concurrent, and a many-to-many multilateral negotiation 160, respectively. The bilateral or one-on-one negotiation 140 is a simple case of the one-to-many multilateral negotiation 150 and the one-to-many multilateral negotiation 150 is in turn a simple case of the many-to-many multilateral negotiation 160. The specific type of negotiation implemented by the negotiation facilitator system is generally dependent upon the rules specified by the negotiation initiator and/or by the default rules. The negotiation rules will be described in more detail subsequently. Each of the three types of negotiations will be described in more detail below.

As shown in FIG. 4, the bilateral or one-on-one negotiation 140 always has exactly one active or ongoing negotiation as designated by an active negotiation link 120 between two active negotiation participants to the active negotiation, a buyer 102 and a seller 104. An active negotiation between the two active participants is defined as a state in which the two active participants can actively exchange counteroffers therebetween. A solid line 120 is utilized to illustrate the active negotiation.

In the bilateral negotiation 140, the buyer 102 or the seller 104 submits or posts a negotiation initiating offer. For purposes of discussion and clarity only, it is assumed that the buyer 102 is the negotiation initiator. Information regarding the offer is generally available to the sellers eligible to participate in the negotiation to enable the sellers to counter offer or otherwise respond to the negotiation initiating offer. A seller eligible to participate in this negotiation may respond with an acceptance of the offer or a counter offer to the initial offer. An acceptance in a one-on-one bilateral negotiation would typically result in a deal and thus terminate the negotiation.

With a counter offer, the negotiation facilitator system examines the counter offer to determine whether the counter offer satisfies the rules of the bilateral negotiation. If the counter offer satisfies the rules of the bilateral negotiation, the buyer may outright reject the counter offer. A rejection of a counter offer has the effect of the counter offer having never been made. Alternatively, the buyer 102 may admit the counter offer into the negotiation such that the negotiation and the active link 120 are established between the two parties. Upon admitting a counter offer, a bilateral negotiation is established and no other sellers may participate in the bilateral negotiation. Typically, no other sellers may submit offers to either the buyer 102 or the seller 104 involved in an active one-on-one bilateral negotiation. Alternatively, other sellers and/or buyers may submit backup offers that is optionally not disclosed to the actively negotiating parties 102, 104 of the bilateral negotiation 140 but are stored by the negotiation facilitator system, such as in a buffer.

Once a counter offer is established, the buyer 102 may submit a counter offer to the counter offer of the seller 104. Once a bilateral negotiation is established, the offeree of each counter offer may accept, counter offer, or reject the counter offer. A rejection of a counter offer has the effect of the counter offer having never been made. A rejection returns the negotiation to the state prior to that counter offer being made and is in essence a request for another counter offer. In addition, an acceptance generally forms a deal and terminates the negotiation. Thus, the buyer and seller may accept, counter offer, or reject the counter offer from the other as well as retract its own counter offer prior to the other party responding thereto.

In addition, prior to the other party responding to a counteroffer of one party, that party can optionally retract its latest offer. A retraction of the party's latest offer may be made if the other party to the negotiation has not responded to the offer being retracted. A retraction of a counter offer has the effect that the retracted counter offer was never made and the state of the negotiation returns to prior to the counter offer was made.

The negotiation may terminate upon expiration of the negotiation or upon the failure of one party to make a counter offer within a specified period of time for a counter offer to be made. Furthermore, at any time during the negotiation, either party may also break off the negotiation to terminate the negotiation. Although not preferred, the negotiation facilitator system may alternatively allow the party who did not break off the negotiation to continue with the negotiation as the new negotiation initiator, either with the initial offer or counter offer or the most recent offer of that party open for response. Thus, another bilateral negotiation may be established with the same rules of the original bilateral negotiation.

As there are only two parties in active bilateral negotiation, all information, except the identities of the parties, if desired, are optionally disclosed to the two parties. Typically little or no information is disclosed to those outside of the negotiation. If any information is disclosed to those outside of the negotiation, such information may include all or a portion of the negotiation initiating offer submitted by the buyer 102, and/or the identities of the parties 102, 104 to the negotiation, for example.

FIG. 5 is a schematic illustrating the one-to-many multilateral negotiation 150. The one-to-many multilateral negotiation 150 shown includes one buyer 102 and three sellers 106. As noted above, a one-to-many multilateral negotiation may alternatively include one seller and two or more buyers. However, for purposes of clarity, it is assumed in the examples described herein that the buyer is the negotiation initiation party of the one-to-many multilateral negotiation.

The one-to-many multilateral negotiation 150 may be a switchable bilateral negotiation, as shown in FIG. 5, or a one-to-many multilateral negotiation. The switchable bilateral negotiation has exactly one active negotiation as designated by the solid line illustrating the active negotiation link 120 between the one buyer 102 and an active seller 106 in active negotiation. The switchable bilateral negotiation may have one or more inactive links as designated by the dashed lines illustrating the inactive negotiation links 122, 124 between the one buyer 102 and two inactive but participating sellers 108. The inactive sellers are not in active negotiation but may submit competing offers to the buyer 102. Such competing offers from inactive sellers are recorded in the memory of the negotiation facilitator system. The competing offers submitted by inactive sellers 108 are disclosed to the buyer 102 and may be partially or wholly disclosed to the active seller 106.

In the switchable bilateral negotiation, certain rules may be implemented regarding competing offers from inactive sellers. For example, a competing offer may be required to be better than the most recent counter offer of the active seller 106 or may be required to exceed the most recent counter offer of the active seller 106 by a predetermined amount, e.g. 10%, as measured by some objective criteria such as a scoring function.

If the negotiation facilitator system determines that the rules relevant to competing offers are not met, the negotiation facilitator system may send an offer invalid or offer rejected message to the offeror and the offer is optionally never disclosed to other parties. Alternatively, if the negotiation facilitator system determines that the rules relevant to completing offers are met, the active link may automatically be switched to between the buyer 102 and the new active seller. In other words, the seller 106 would be dropped from the active negotiation with a drop message to the seller 106 and the buyer 102 and there would no longer be an active link between the buyer 102 and the seller 106. Seller 106 becomes an inactive seller who can now submit competing offers. The buyer 102 begins active negotiation with the seller 108 that submitted the qualifying competing offer. Alternatively, the active link may be switched by the buyer 102 such that the qualifying competing offer is disclosed to the buyer 102 for consideration of whether to switch the active link by dropping the seller 106, rather than automatically dropping seller 106 for the seller 108 with the qualifying competing offer.

The switchable bilateral negotiation may terminate upon a break off of the negotiation by the buyer, but not by the active seller. In addition, the switchable bilateral negotiation may also terminate upon expiration of the negotiation, upon failure of one party to make a counter offer within a specified period of time for a counter offer to be made, or upon the formation of a deal, e.g. upon an acceptance of the negotiation.

Alternatively, the one-to-many multilateral negotiation 150 may be a concurrent bilateral negotiation. As the name suggests, a concurrent bilateral negotiation is simply one or more bilateral negotiations taking place concurrently. Accordingly, a concurrent bilateral negotiation may have more than one active negotiation link between the one buyer and one or more of the sellers. Thus, there is no switching of the active link and no rules regarding the automatic or manual switching of the active link.

Each seller in a concurrent bilateral negotiation may submit a counter offer to the buyer 102, assuming the counter offer satisfies all relevant rules. Once the negotiation facilitator system validates the offer, an active negotiation may be automatically established between the buyer and the offer-submitting seller or the buyer may have the option to manually choose to enter into active negotiation with the seller by responding with a counter offer.

The concurrent bilateral negotiation may terminate upon a break off of all the concurrent negotiations by the buyer, upon expiration of the negotiation, or upon the formation of a deal, e.g. upon an acceptance of the offer by the buyer. The formation of a deal is typically more complex than in the case of the switchable bilateral negotiation. Although the buyer is involved in more than one bilateral negotiations concurrently, presumably the buyer only desires to enter into one deal with one of the sellers. As is evident, by being involved in more than one bilateral negotiations concurrently, the buyer will have more than one offer outstanding, with some offers more favorable to the buyer than other offers. In the case where the buyer submits an acceptance to a seller's counter offer, a break off message is sent to all other sellers and a deal is made with the terms of the seller's counter offer.

However, the case where a seller submits an acceptance to the buyer's offer to that seller may be more complex. For example, where Seller A submits an acceptance to the buyer's offer to Seller A, the negotiation facilitator system may require a deal to be made with the terms of the buyer's offer to Seller A. More preferably, the negotiation facilitator system may send a request for final offer message to all the sellers such that each seller, including Seller A, can submit one final offer, if desired. The negotiation facilitator system preferably requires each of the seller's final offer to be an improvement, such as by 10%, over the most current offer from that seller in order for that final offer to be validated by the negotiation facilitator system. The deal is preferably selected from the final offers submitted by each of the sellers.

Of course, other deal striking schemes may be implemented. For example, upon an accept message from Seller A, the negotiation facilitator system may allow negotiation by all the parties for a predetermined amount of time, e.g., 20 minutes, the deal being the best offer selected from the outstanding offers at the expiration of the final time period. In each case, all subsequent offers by each seller must be better than the most current offer of that seller in order for that subsequent offer to be validated by the negotiation facilitator system.

FIG. 6 shows a schematic of the many-to-many multilateral negotiation 160. At any point in time, the many-to-many multilateral negotiation 160 includes one or more individual negotiations involving the same or similar goods. An individual negotiation refers to a bilateral negotiation or a one-to-many multilateral negotiation, either a switchable bilateral negotiation or a concurrent bilateral negotiation. The general concepts and methodologies of the bilateral, switchable bilateral, and concurrent bilateral negotiations are as described above with reference to FIGS. 4 and 5.

In the example shown in FIG. 6 and only for purposes of clarity, a buyer is always the only buyer negotiation with one or more sellers in each individual bilateral or one-to-many negotiation. In other words, each of the individual bilateral, switchable bilateral, and/or concurrent bilateral negotiations making up the many-to-many multilateral negotiation 160 always includes a single buyer and one or more sellers. The negotiation facilitator may determine that each individual negotiation is one buyer with one or more sellers (or vice versa), if, for example, a buyer is the negotiation initiator. Alternatively, such determination may be made by the negotiation facilitator system, by default, or any other suitable mechanism.

In the example of the many-to-many multilateral negotiation 160 shown in FIG. 6, Buyers A, C, and D are engaged in switchable bilateral negotiations with Sellers A, B, C, Sellers A, B, C, and Sellers A, C, respectively. In the three switchable bilateral negotiations of the many-to-many multilateral negotiation 160, Sellers A, C, and C are active sellers in active negotiation with Buyers A, C, and D. Further, Sellers B and C, Sellers A and B, and Seller A are inactive sellers in the switchable bilateral negotiations with Buyers A, C, and D, respectively. Each of the active negotiations between one of the sellers and one of the buyers is represented by a solid line while each of the inactive negotiations between one of the sellers and one of the buyers is represented by a dashed line. Although Seller B is neither an active nor an inactive seller in the switchable bilateral negotiation with Buyer D, Seller B may submit a qualifying or validated offer to Buyer D such that an active or inactive link would be established between Seller B and Buyer D.

The many-to-many multilateral negotiation 160 further includes a concurrent bilateral negotiation between Buyer B on the one hand and Sellers A and B on the other hand.

Although no active link is established between Buyer B and Seller C, Seller C may submit a qualifying offer to Buyer B such that an active negotiation link would be established between Seller C and Buyer B. It is noted that only active links are established between a buyer and a seller in any given concurrent bilateral negotiations.

Although the above described bilateral negotiations has assumed all active links as in the case of concurrent bilateral negotiation or a single active link as in the case of switchable bilateral negotiation, it is to be understood that a hybrid bilateral negotiation may be established as a stand alone bilateral negotiation or as part of a many-to-many multilateral negotiation. A hybrid bilateral negotiation may include more than one active links as well as one or more inactive links. In other words, a hybrid bilateral negotiation is a combination of the switchable bilateral and the concurrent bilateral negotiations. For example, the hybrid bilateral negotiation has deal forming rules similar to those of the concurrent bilateral negotiation and formation of an active link rules similar to those of the switchable bilateral negotiation.

In addition, in the many-to-many multilateral negotiation 160, an additional rule preferably specifies whether a given party may serve as the active negotiation party in one or more active negotiations. For example, a given buyer may be in a bilateral negotiation with one of the sellers and also in a switchable bilateral negotiation with two or more of the other sellers. Each of the two negotiations would be independent of each other during the negotiation process. Of course, the two negotiations would no longer be independent of each other when an acceptance is submitted or during a deal forming process, for example.

In the many-to-many multilateral negotiation 160, a party may submit an offer that is directed or undirected. As discussed above, a directed offer generally must also include the target party's identification while an undirected offer may also specify parties eligible to respond to the offer. Once a directed offer is validated in a switchable bilateral negotiation, a link, whether active or inactive, is established between the two parties, if a link did not previously exist. In a concurrent bilateral negotiation, the link would be an active negotiation link between the two parties. For an undirected offer, the negotiation facilitator system may determine to which targets the undirected offer would be valid, and, in essence, the undirected offer then becomes similar to a directed offer directed to those targets.

The information disclosed to the parties involved in the many-to-many multilateral negotiation 160 optionally follows the disclosure rules as described above for the switchable and concurrent bilateral negotiations. For example, the disclosure of information within the switchable bilateral negotiation between Buyer A and Sellers A, B and C is similar to that described above for switchable bilateral negotiations.

Negotiation State Machine of the Negotiation Facilitator System

Figure 7A:
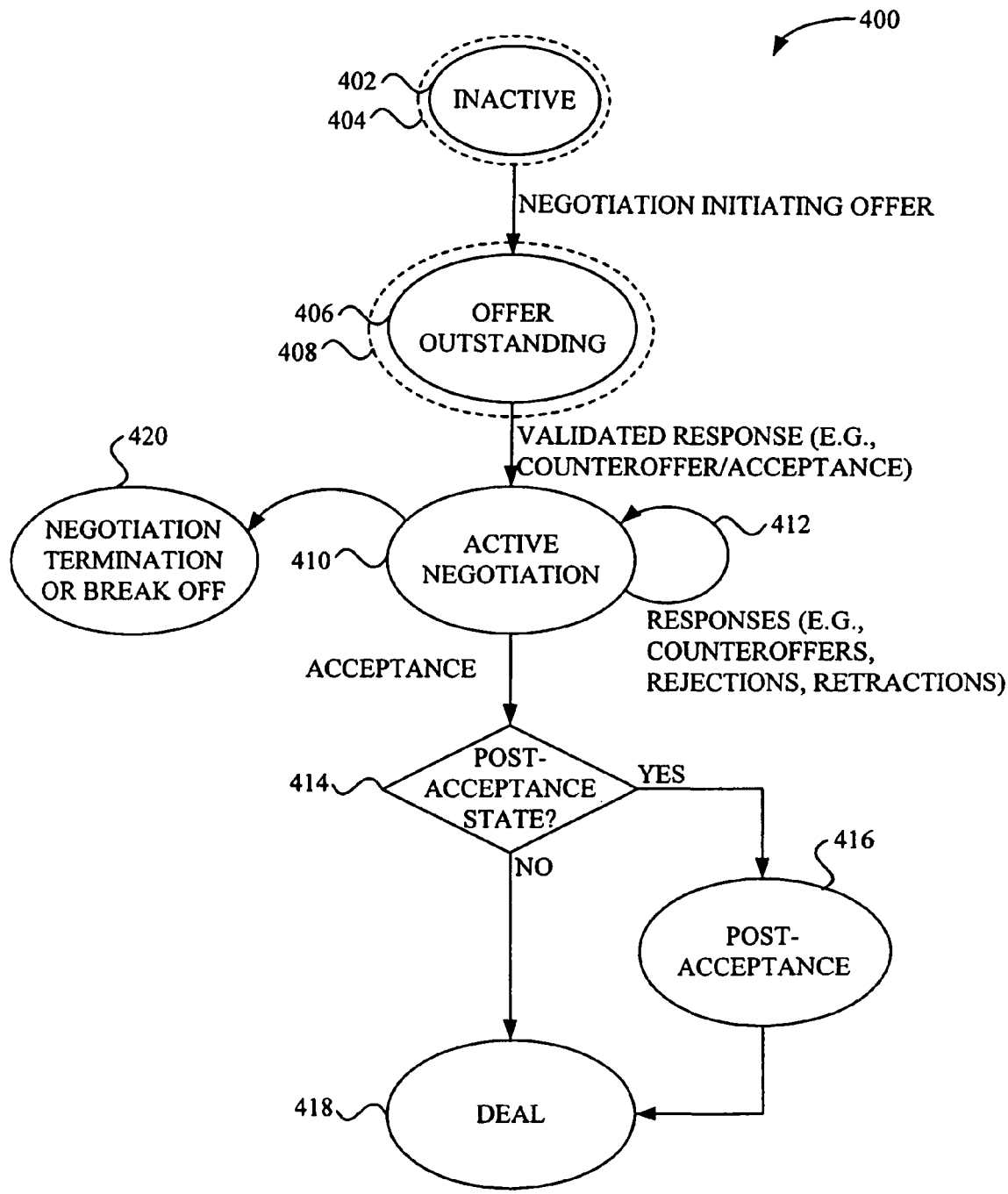
FIG. 7A is a state diagram illustrating global states of a negotiation as maintained by a negotiation facilitator system.

For each negotiation, whether bilateral, one-to-many multilateral, or many-to-many multilateral, the negotiation facilitator system 110 sets up and maintains a negotiation state machine as shown in the global state diagram 400 of FIG. 7A. At state 402, the negotiation is in an inactive state. The inactive state is merely prior to the formation of an active negotiation and, generally, no negotiating party has been identified. However, a negotiation may remain in an inactive state even where a negotiation initiating offer has been made. In such a case, the negotiation is in a buffered inactive state as shown by the dashed line 404. The buffered inactive state 404 may occur if, for example, the negotiation facilitator system only initiates a negotiation at certain times and/or on certain days.

Once a negotiation initiating offer is made by either a buyer or a seller and validated by the negotiation facilitator system, the negotiation is in an offer outstanding state 406. The negotiation may remain in the offer outstanding state even where a validated response to the negotiation initiating offer has been made. In such a case, the negotiation is in a buffered offer outstanding state as shown by the dashed line 408. The buffered offer outstanding state 408 may occur if, for example, the negotiation facilitator system requires the negotiation initiating offer to be posted for a predetermined period of time prior to admittance of responses such as counteroffers or acceptances.

Upon admittance of a validated response, such as a counteroffer or acceptance, the negotiation is in an active negotiation state 410. Additional responses 412 such as additional counteroffers and rejections and retractions of offers, etc., maintains the negotiation in the active negotiation state 410.

Upon receipt of an acceptance validated by the negotiation facilitator system, the next state of the negotiation depends upon whether the negotiation rules provides for a post-acceptance state shown in state 414. If so, the negotiation is then in the final post-acceptance state 416. The final post-acceptance state 416 may include a call by negotiation facilitator system for a single final offer from each of the negotiating parties within a predetermined period of time or a call by the negotiation facilitator system for all subsequent offers within a predetermined period of time such that each negotiating party may submit as many post-acceptance offers as desired within the time limitations.

Upon termination of the post-acceptance state 416, a deal state 418 is the final state of the negotiation. Alternatively, if the negotiation rules does not provide for a post-acceptance state, such as typically is the case with a bilateral negotiation between two parties, the negotiation proceeds directly to the deal state 418. The deal is made based upon the rules of the negotiation as applied by the negotiation facilitator system.

Alternatively, the negotiation may reach a negotiation break off or termination state 420 when the negotiation breaks off or when the parties fail to strike a deal within some predetermined time limit, for example.

Figure 7B:
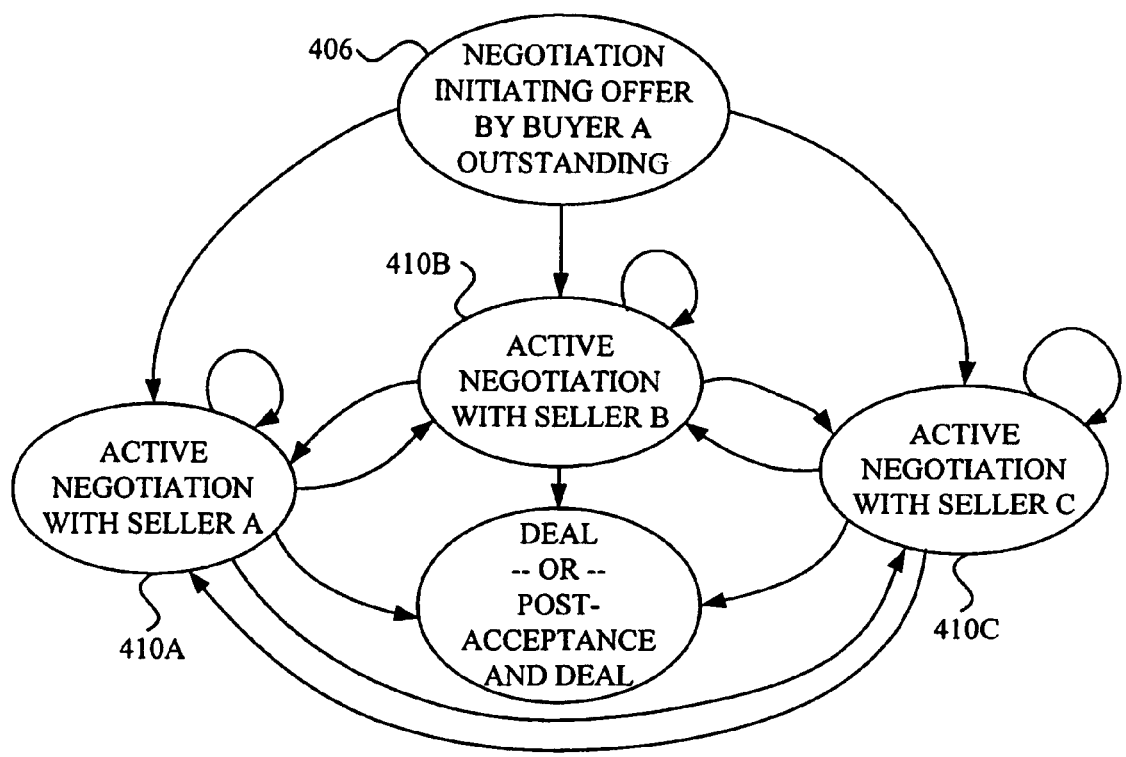
FIG. 7B is a state diagram illustrating local states of a negotiation as maintained by a negotiation facilitator system.

FIG. 7B is a local state diagram 450 generally illustrating by way of example the local states of the active negotiation state of a switchable bilateral negotiation between Buyer A and Sellers A, B, and C, similar to the switchable bilateral negotiation shown in FIG. 5. In the example shown in FIG. 7B, the negotiation transitions from the initiating offer by Buyer A outstanding state 406 to one of the active negotiation states 410 upon the admittance of a response from one of the Sellers A, B, and C, such as a counteroffer or acceptance, validated by the negotiation facilitator system. The negotiation state diagram of the switchable bilateral negotiation between one buyer and three sellers is merely exemplary. As is evident, the negotiation state diagrams for a concurrent bilateral negotiation and for a many-to-many multilateral negotiation would be more complex.

As shown, when the negotiation is in any of the active negotiation states 410A, 410B, 410C between Buyer A and Sellers A, B, and C, respectively, the negotiation can remain in that active negotiation state or transition to one of the other negotiation states. In the latter case, the negotiation state essentially switches from one active negotiation state to another active negotiation state.

Negotiation Rules

Various rules that govern the negotiation are optionally specified by the negotiation initiator and/or set to default values or states by the negotiation facilitator system. The rules define the type of negotiation, i.e., one-to-one bilateral, one-to-many switchable bilateral, one-to-many concurrent bilateral, and many-to-many multilateral negotiation.

The rules are generally static and/or dynamic. The negotiation facilitator system can determine whether the offer satisfies the static rules by examining the offer in isolation, without reference to the history of the negotiation or the current state of the negotiation. On the other hand, to determine whether the offer satisfies the dynamic rules, the negotiation facilitator system must examine the offer in view of the history of the negotiation and/or the current state of the negotiation.

Examples of static rules include rules relating to which parties are eligible to participate in the negotiation, rules relating to which zip codes of the delivery location are allowable, rules relating to the negotiability of the attributes, and rules relating to the format of the input for a given attribute, e.g., dollars and cents for price. Examples of dynamic rules include rules ensuring that the offer is an improvement over or better than the current outstanding offer, rules limiting the number of offers submitted by each buyer or seller, and rules that each offer must be made within a predetermined period of time since the last offer.

The negotiation initiator may specify the negotiability of the attribute value, i.e., whether the value specified for each of the selected attributes is fixed and non-negotiable or negotiable. Thus, another party cannot submit an offer with a different value for an attribute that is fixed and non-negotiable. In addition, the negotiation initiator may specify acceptable ranges of values of the selected attributes from the domain associated with the attribute such that another party cannot submit an offer with a value outside of the acceptable range associated with that attribute. For example, the negotiation initiator may specify that the zip code of the manufacturing and/or the delivery location attribute is some subset of the domain of all U.S. zip codes, e.g., zip codes corresponding to the Southwest region of the U.S. The fixed and non-negotiable attribute rule and the acceptable range rule are additional examples of static rules.

The negotiation initiator preferably specifies the expiration date and time of the negotiation. The time limitation rules are typically dynamic rules. If no convergence or settlement of the negotiation is reached by the expiration of the negotiation such as in the form of a break off of negotiation or an acceptance of the terms of an offer, the negotiation is deemed terminated. The negotiation initiator may optionally specify the expiration date and time of the offer itself. Thus, if there is no response to the initial offer, such as in the form of an acceptance of the initial offer or a counter offer to the initial offer, by the expiration of the offer, the initial offer is deemed withdrawn and the negotiation terminated.

Although not preferred, the negotiation initiator may choose not to specify an expiration of the offer or the negotiation such that the initial offer remains outstanding until a counter offer is received by the negotiation initiator, until break off of negotiations, or until the initial offer is withdrawn.

The negotiation initiator may also select parties eligible or non-eligible to participate in the negotiation. This is another example of a static rule. The negotiation facilitator system preferably defaults to allow all parties to participate in the negotiation.

Further, the negotiation initiator may optionally specify disclosure rules, such as disclosure of the identities of offer submitting parties, and if disclosed, which parties are privy to the identities of the offer submitting parties. For example, the negotiation initiator may specify that all parties are to remain anonymous. In addition, the disclosure rules may include rules governing the disclosure, whether none, portions, or all, of the details of the offers, depending upon whether the offer is the current active offer or a backup offer, for example. The disclosure rules may further include rules governing the disclosure of the details of the deal made through the negotiation. Although some disclosure rules may be dynamic rules, the disclosure rules are generally static rules.

Typically, the disclosure rules allow the disclosure of the information contained in the free text box, as the intent of the free text box is to convey all additional information to others. Thus, although the negotiation facilitator system discloses information according to the well defined disclosure rules, each party may disclose the same and/or various other information in the free text box. However, such information may not be deemed as credible by the receiving party. Thus, the disclosure rules are important in that the negotiation facilitator system may serve as a facilitator and/or source of information with greater credibility.

The negotiation initiator may also define rules relating to offers. For example, a rule may specify whether and when offers are to be submitted to the party to which the offer is targeted for consideration when the target is already in active negotiation with another party. As another example, a rule may require each offer to improve upon the existing current offer by a certain amount, e.g., 10% as measured by some objective criteria such as a scoring function, before the offer is to be even disclosed to the target of the offer for consideration. A scoring function typically involves the weighting of the attributes as defined by the negotiation facilitator system and/or by the negotiation initiator. A rule may also limit the number of offers submitted by each party and/or the number of offers submitted to the negotiation initiator. Rules relating to offers generally define the type of negotiation, i.e. one-to-one bilateral, one-to-many switchable bilateral, one-to-many concurrent bilateral, and many-to-many multilateral negotiation. As is evident, such offer rules may include static and/or dynamic rules.

The negotiation initiator may also define rules relating to other aspects of the negotiation such as deal striking rules. For example, whether an acceptance by a negotiating party directly results in a deal being made with that negotiating party or merely that all negotiation participating parties have one last chance to submit a final offer. As is evident, such deal striking rules may include static and/or dynamic rules.

Negotiation Process

Figure 7C:
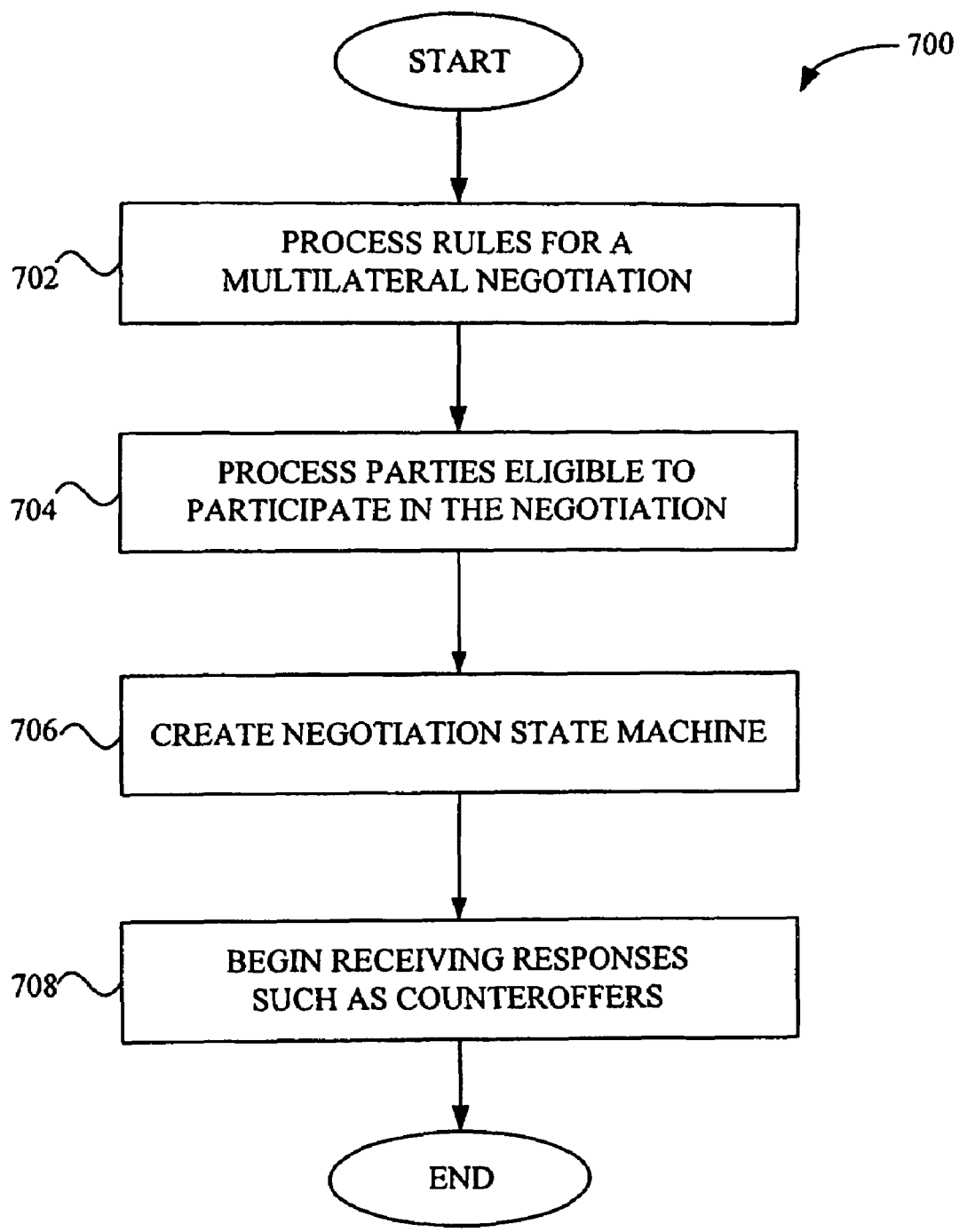
FIG. 7C is a flowchart illustrating a process for setting up a multilateral negotiation by a negotiation facilitator system.

FIG. 7C is a flowchart illustrating a process 700 for setting up a negotiation, including a one-to-one and one-to-many negotiations, and a negotiation state machine by the negotiation facilitator system. At step 702, the rules of the multilateral negotiation are processed. The rules may include disclosure rules, offer and negotiation rules, and deal striking rules. At step 704, the parties eligible to participate in the multilateral negotiation are processed. Although shown as subsequent to step 702, step 704 may be executed prior to or concurrently with step 702.

At step 706, the negotiation state machine is created for maintaining a current state of the negotiation and a history of the negotiation, if desired. The negotiation state machine is updated throughout the negotiation. At step 708, the negotiation facilitator system begins receiving responses such as counter offers.

Figure 8:
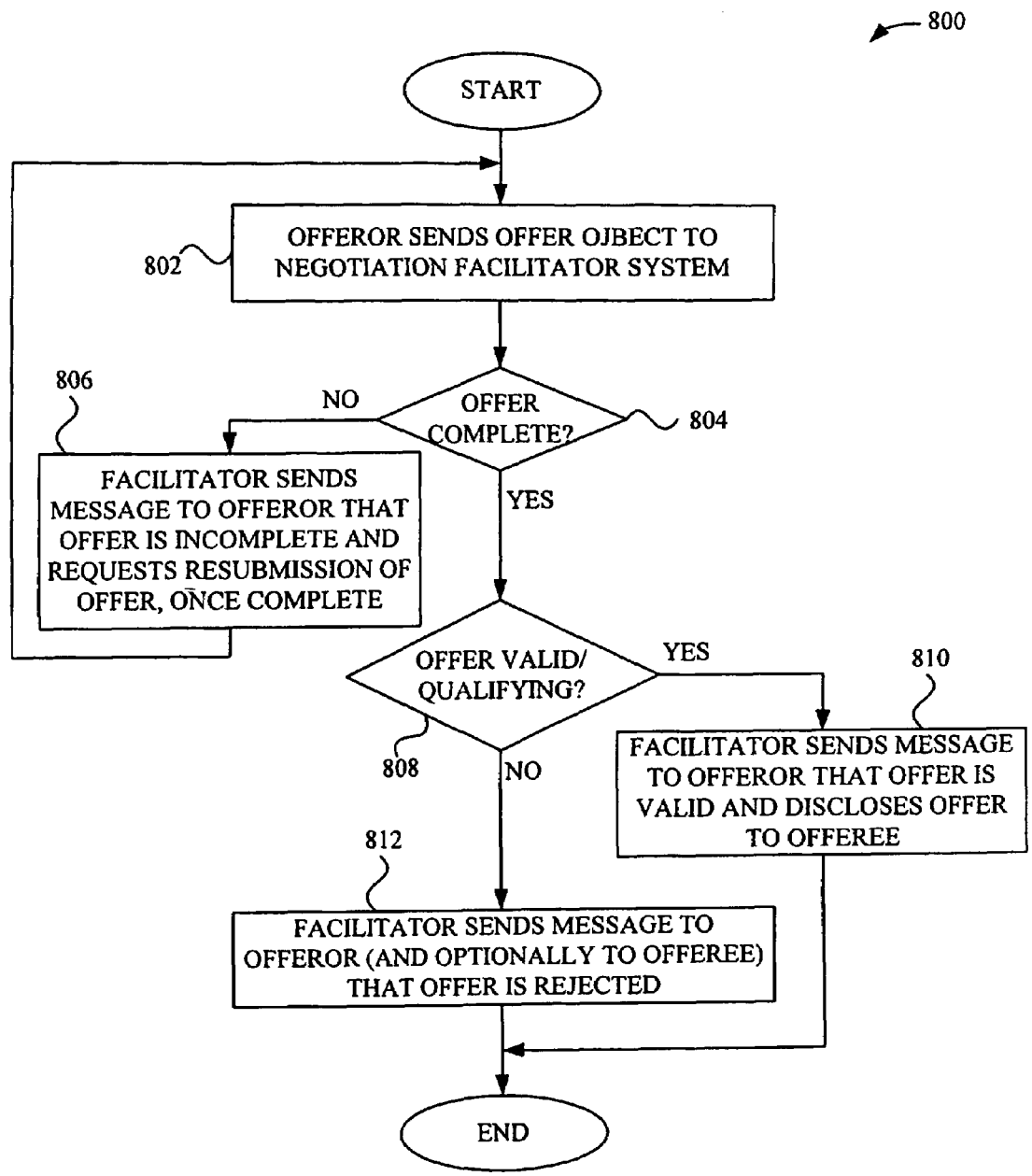
FIG. 8 is a flowchart illustrating a process for validating an offer by the negotiation facilitator system.

FIG. 8 is a flowchart illustrating a process 800 for validating or qualifying an offer by a negotiation facilitator system, i.e., a determination of whether the offer may be admitted into the negotiation. At step 802, an offeror sends an offer object to the negotiation facilitator system. At step 804, the negotiation facilitator system examines the offer object for completeness. If the offer is incomplete, such as when the offer fails to specify one of the attributes, then negotiation facilitator system sends a message to the offeror that the offer is incomplete and requests resubmission of the offer once complete at step 806. The process 800 then returns to step 802 where the offeror sends another offer object to the negotiation facilitator system.

Alternatively, if the offer is complete, then the negotiation facilitator system proceeds to step 808 to determine whether the offer is valid or qualifying. This determination typically involves ensuring that the offer satisfies all rules, both static and dynamic, specified for the negotiation. If the negotiation facilitator system determines that the offer is valid, then the negotiation facilitator system sends a message to the offeror that the offer is valid and discloses the terms of the offer to the offeree(s) at step 810. On the other hand, if the negotiation facilitator system determines that the offer is not valid, then the negotiation facilitator system sends a message to the offeror, and optionally the offeree, that the offer is rejected at step 812. Preferably, the details of the invalid offer are not disclosed to the offeree. The process 800 then ends. The process 800 may be repeated where the offeror may revise the original offer or submit another offer.

Figure 9:
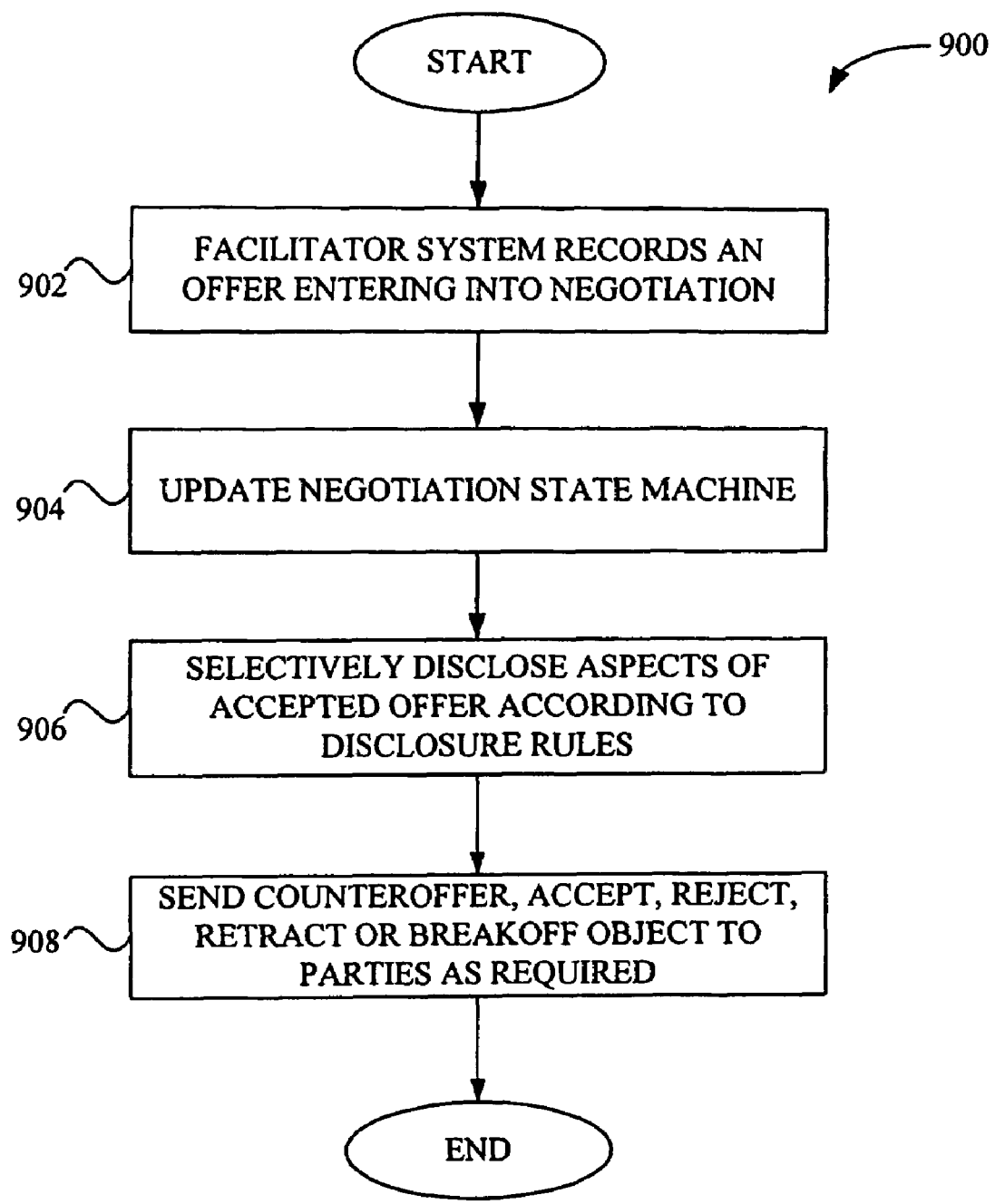
FIG. 9 is a flow chart illustrating a process for processing a validated offer by the negotiation facilitator system.

FIG. 9 is a flow chart illustrating a process 900 for processing an offer admitted into the negotiation by the negotiation facilitator system. At step 902, negotiation facilitator system records the offer allowed to enter the negotiation. This allows the negotiation facilitator system to keep track of the current outstanding offers and facilitates a display of the history of the negotiation, if desired. At step 904, the negotiation facilitator system updates the negotiation state machine to facilitate in keeping track of the current state of the negotiation. A negotiation state machine is formed for each multilateral negotiation such as upon receiving the negotiation initiating offer from the negotiation initiator. The negotiation state machine is updated each time the state of the negotiation changes, such as upon admittance of a counter offer, an offer rejection, an offer retraction, an offer acceptance, and a negotiation break off.

At step 906, the negotiation facilitator system selectively discloses aspects of the admitted offer, such as identities and/or details of the offer, to parties of the negotiation and/or parties outside of the negotiation according to disclosure rules. In particular, the negotiation facilitator system discloses all aspects of the admitted offer, except for the identify of the offeror, if desired, to the offeree(s), i.e., target(s) of the offer. The negotiation facilitator system may disclose some, all, or none of the details relating to the offer to anyone outside of the active negotiation.

At step 908, the negotiation facilitator system sends a counter offer, accept, reject, retract, or break off object to the parties as required or requested. For example, if a seller is the party who submitted a valid counter offer, the buyer may counter offer, accept or reject the offer, or break off the negotiation. In addition, the seller may break off the negotiation or retract the seller's counter offer before the buyer takes action with the buyer's counter offer, acceptance, rejection, or break off.

Figure 10:
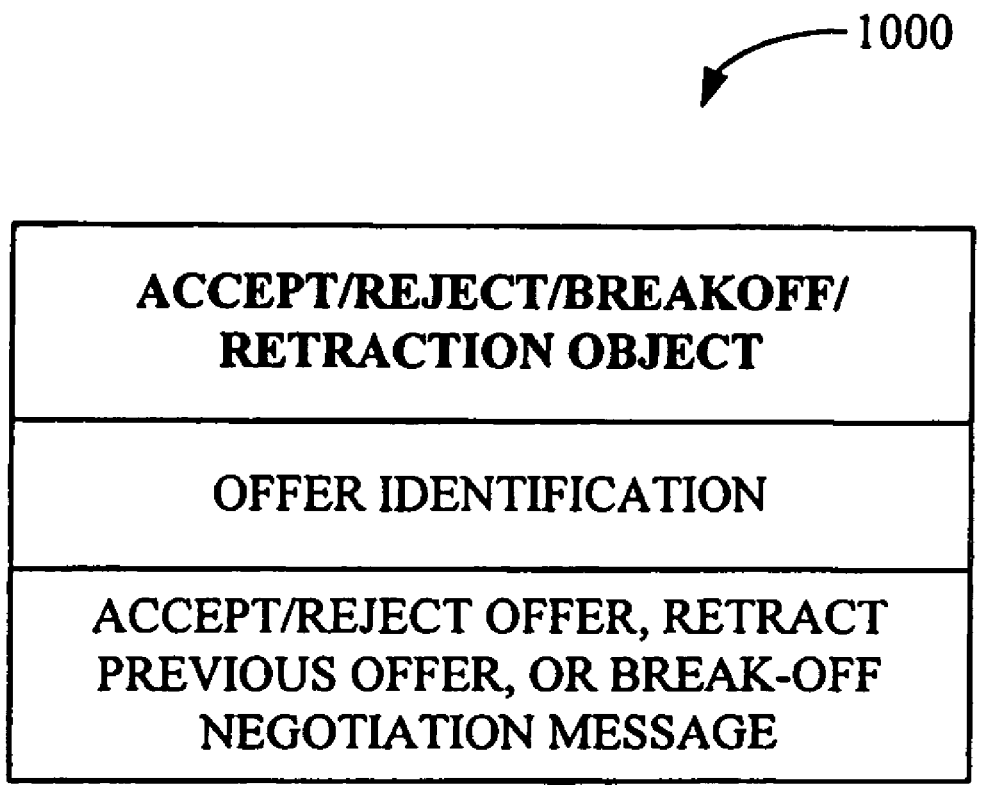
FIG. 10 shows an example of an object for submitting an acceptance, a rejection, a break off, or a retraction message.

FIG. 10 shows an example of an object 1000 for submitting an acceptance, a rejection, a break off, or a retraction message, i.e., if the message is other than to submit a counter offer. As noted above, a party may retract its most current offer if no response thereto has been submitted.

Figure 11:
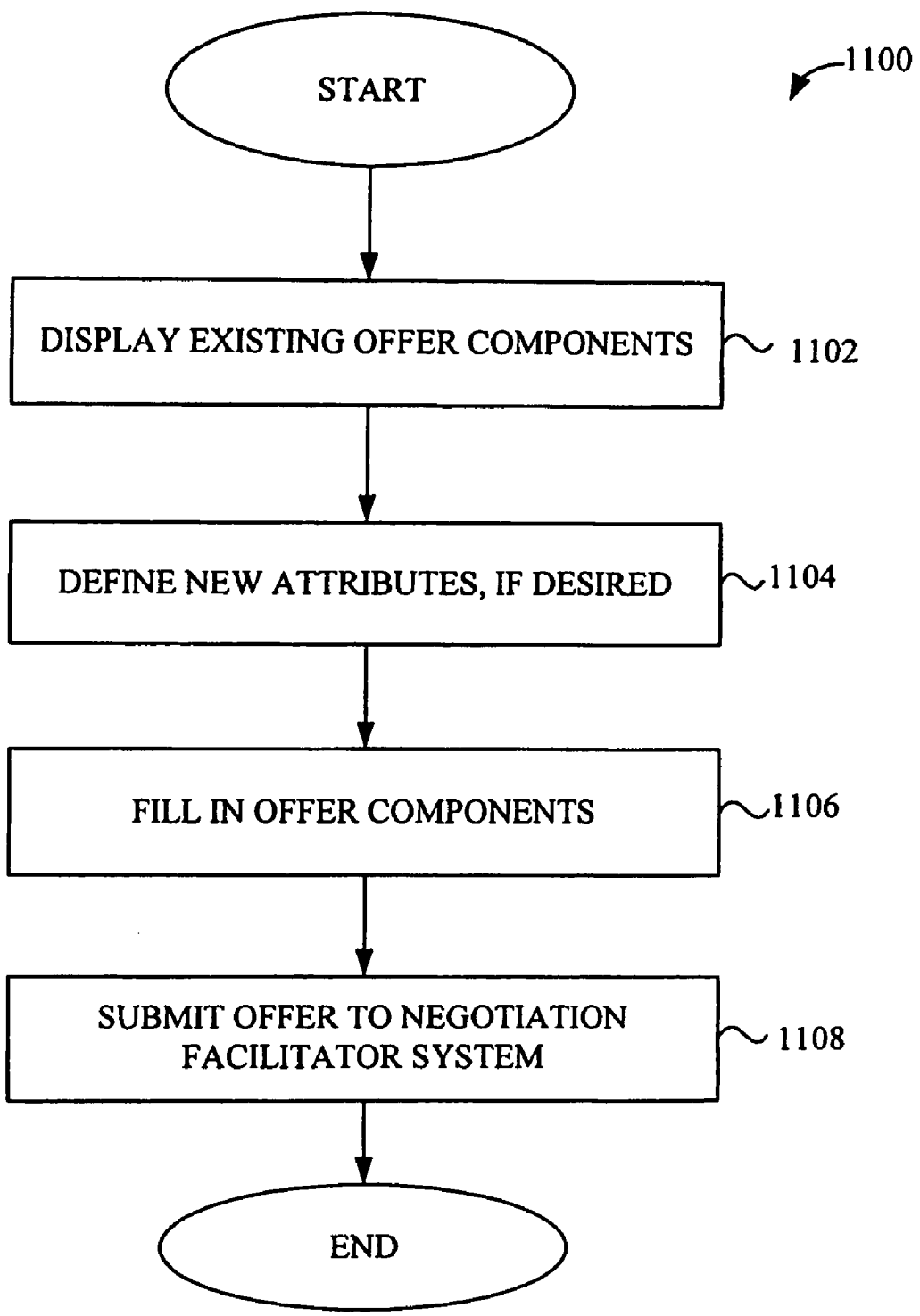
FIG. 11 is a flowchart for a process for forming a counter offer by a party in response to an initial offer or to another counter offer.

FIG. 11 is a flowchart for a process 1100 for forming a counter offer by a party in response to an initial offer or to another counter offer. At step 1102, some of the components of the existing offer to which the counter offer is in response, i.e., the initial offer or another counter offer are displayed as the counter offer is based that existing offer. These components typically include all the attributes of the offer. At step 1104, new attributes for the counter offer are added and defined, if desired, by the party forming the counter offer. As noted above, the counter offering party may select one or more new attributes from the database or library of attributes provided by the negotiation facilitator system and/or one or more attributes custom defined by the counter offering party. At step 1106, the counter offering party fills in the components of the counter offer, including the newly added attributes. After completing the counter offer, the counter offer is submitted to the negotiation facilitator system at step 1108.

The above described method and process are preferably implemented in a computer program product having computer codes that perform the various steps of the method and process. The computer codes are preferably stored in a computer readable medium, such as CD-ROM, zip disk, floppy disk, tape, flash memory, system memory, hard drive, and data signal embodied in a carrier wave, such as over a network.

Figure 12:
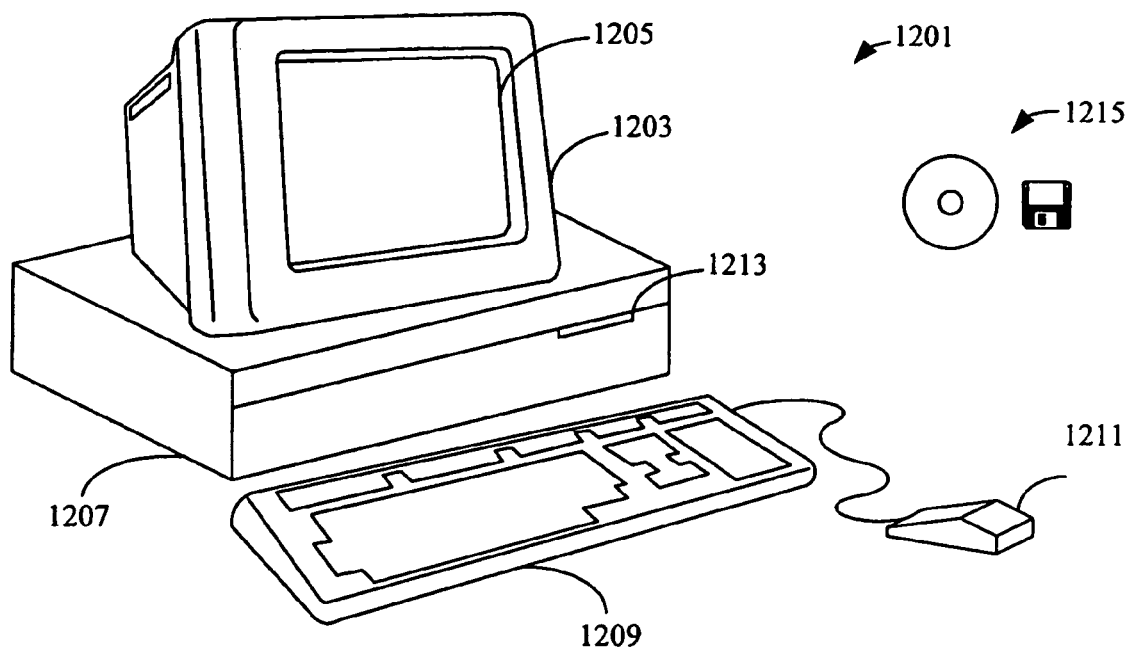
FIG. 12 illustrates an example of a computer system that can be utilized to execute the software of an embodiment of the invention and use hardware embodiments.

FIG. 12 illustrates an example of a computer system that can be used to execute software such as the computer program product implementing an embodiment of the invention and use hardware embodiments. FIG. 12 shows a computer system 1201 that includes a display 1203, screen 1205, cabinet 1207, keyboard 1209, and mouse 12011. Mouse 12011 can have one or more buttons for interacting with a GUI (graphical user interface). Cabinet 1207 houses a CD-ROM drive 1213, system memory and a hard drive (see FIG. 13) which can be utilized to store and retrieve software programs incorporating computer code that implements aspects of the invention, data for use with the invention, and the like. Although a CD-ROM and a floppy disc 1215 are shown as exemplary computer readable storage media, other computer readable storage media including tape, flash memory, system memory, and hard drive can be utilized as noted above. Additionally, a data signal embodied in a carrier wave (e.g., in a network including the Internet) can be the computer readable storage medium.

Figure 13:
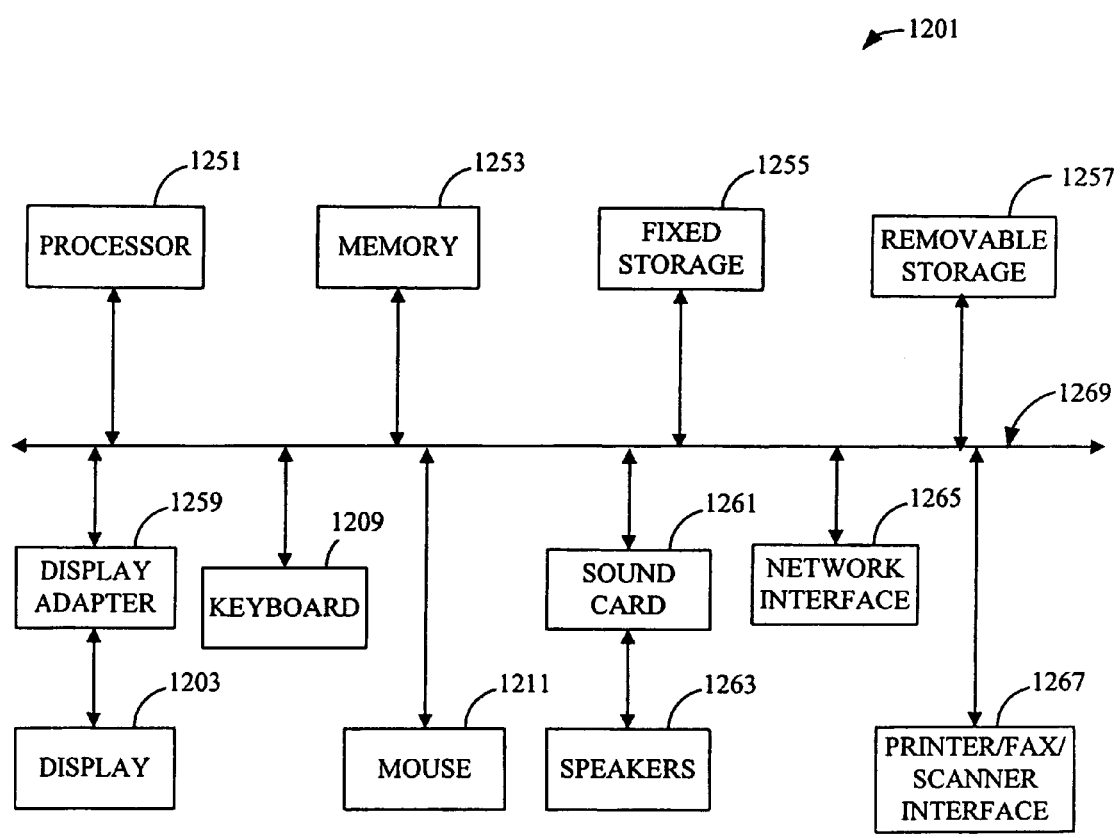
FIG. 13 illustrates a system block diagram of the computer system of FIG. 12.

FIG. 13 shows a system block diagram of computer system 1201 used to execute a software of an embodiment of the invention or use hardware embodiments. As in FIG. 12, computer system 1201 includes monitor 1203 and keyboard 1209, and mouse 12011. Computer system 1201 further includes subsystems such as a central processor 1251, system memory 1253, fixed storage 1255 (e.g., hard drive), removable storage 1257 (e.g., CD-ROM drive), display adapter 1259, sound card 1261, transducers 1263 (speakers, microphones, and the like), network interface 1265, and printer, facsimile, and/or scanner interface 1267. Other computer systems suitable for use with the invention can include additional or fewer subsystems. For example, another computer system could include more than one processor 1251 (i.e., a multi-processor system) or a cache memory.

The system bus architecture of computer system 1201 is represented by arrows 1269. However, these arrows are illustrative of any interconnection scheme serving to link the subsystems. For example, a local bus could be utilized to connect the central processor to the system memory and display adapter. Computer system 1201 shown in FIG. 13 is but an example of a computer system suitable for use with the invention. Other computer architectures having different configurations of subsystems can also be utilized.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A machine-readable medium having instructions to cause a machine to perform a method of managing a switchable bilateral electronic negotiation, the method comprising:
    facilitating a first active negotiation between a first party and a second party, wherein facilitating the first active negotiation includes exchanging multi-attribute offers between the first party and the second party;
    facilitating a first inactive negotiation between the first party and a third party, wherein facilitating the first inactive negotiation includes receiving a submitted multiattribute offer from the third party;
    automatically dropping the first active negotiation between the first party and the second party based on one or more rules relevant to the multi-attribute offers;
    facilitating a second active negotiation between the first party and the third party;
    facilitating a second inactive negotiation between the first party and the second party;
    receiving an indication of an acceptable negotiation associated with the second active negotiation, the indication of an acceptable negotiation indicating that the third party has one last chance to submit a final multi-attribute offer; and
    sending a message to the third party requesting the final multi-attribute offer.

2. The machine-readable medium of claim 1, wherein facilitating the first active negotiation includes updating a first negotiation object.

3. The machine-readable medium of claim 1, wherein facilitating the first inactive negotiation includes updating a second negotiation object.

4. The machine-readable medium of claim 1, wherein facilitating the second active negotiation includes receiving a multi-attribute offer from the third party.

5. The machine-readable medium of claim 4, wherein the submitted multi-attribute offer is greater than a most recent submitted multi-attribute offer from the second party associated with the first active negotiation.

6. The machine-readable medium of claim 1 further comprising:
    receiving a retraction of an offer associated with the acceptable negotiation associated with the second active negotiation and retracting the offer associated with the second active negotiation.

7. The machine-readable medium of claim 1, wherein the one or more rules indicate to automatically drop the first active negotiation if the multiattribute offer received from the second party is less than a predetermined amount.

8. The machine-readable medium of claim 1, wherein the one or more rules indicate to automatically drop the first active negotiation if the multiattribute offer is not received from the second party within a predetermined amount of time.

9. A method of managing a switchable bilateral electronic negotiation, the method comprising:
    facilitating a first active negotiation between a first party and a second party, wherein facilitating the first active negotiation includes exchanging multi-attribute offers between the first party and the second party;
    facilitating a first inactive negotiation between the first party and a third party,
    wherein facilitating the first inactive negotiation includes receiving a submitted multiattribute offer from the third party;
    automatically dropping the first active negotiation between the first party and the second party based on one or more rules relevant to the multi-attribute offers;
    facilitating a second active negotiation between the first party and the third party;
    facilitating a second inactive negotiation between the first party and the second party;
    receiving an indication of an acceptable negotiation associated with the second active negotiation, the indication of an acceptable negotiation indicating that the third party has one last chance to submit a final multi-attribute offer; and sending a message to the third party requesting the final multi-attribute offer.

10. The method of claim 9, wherein facilitating the first active negotiation includes updating a first negotiation object.

11. The method of claim 9, wherein facilitating the first inactive negotiation includes updating a second negotiation object.

12. The method of claim 9, wherein facilitating the second active negotiation includes receiving a multi-attribute offer from the third party.

13. The method of claim 12, wherein the submitted multi-attribute offer is greater than a most recent submitted multi-attribute offer from the second party associated with the first active negotiation.

14. The method of claim 9 further comprising:
    receiving a retraction of an offer associated with the acceptable negotiation associated with the second active negotiation and retracting the offer associated with the second active negotiation.

15. The method of claim 9, wherein the one or more rules indicate to automatically drop the first active negotiation if the multi-attribute offer received from the second party is less than a predetermined amount.

16. The method of claim 9, wherein the one or more rules indicate to automatically drop the first active negotiation if the multi-attribute offer is not received from the second party within a predetermined amount of time.

17. A system for managing a switchable bilateral electronic negotiation, including:
    a processor; and
    a memory coupled with the processor, wherein the memory is configured to provide the processor with instructions which when executed cause the processor to:
        facilitate a first active negotiation between a first party and a second party, wherein facilitating the first active negotiation includes exchanging multi-attribute offers between the first party and the second party;

facilitate a first inactive negotiation between the first party and a third party, wherein facilitating the first inactive negotiation includes receiving a submitted multiattribute offer from the third party;

automatically drop the first active negotiation between the first party and the second party based on one or more rules relevant to the multi-attribute offers;

facilitate a second active negotiation between the first party and the third party;

facilitate a second inactive negotiation between the first party and the second party;

receive an indication of an acceptable negotiation associated with the second active negotiation, the indication of an acceptable negotiation indicating that the third party has one last chance to submit a final multi-attribute offer; and send a message to the third party requesting the final multi-attribute offer.

18. The system of claim 17, wherein facilitating the first active negotiation includes updating a first negotiation object.

19. The system of claim 17, wherein facilitating the first inactive negotiation includes updating a second negotiation object.

20. The system of claim 17, wherein facilitating the second active negotiation includes receiving a multi-attribute offer from the third party.

* * * * *